United States Patent [19]

Inuyama

[11] Patent Number: 4,647,946
[45] Date of Patent: Mar. 3, 1987

[54] LASER BEAM RECORDER HAVING SYNCHRONIZED SCANNER AND DRUM OPERATIONS

[75] Inventor: Toshihiko Inuyama, Fujisawa, Japan

[73] Assignee: Canon Kabushiki Kaisha, Tokyo, Japan

[21] Appl. No.: 699,327

[22] Filed: Feb. 7, 1985

[30] Foreign Application Priority Data

Feb. 15, 1984 [JP] Japan .................................. 59-26505

[51] Int. Cl.⁴ ........................ G01D 9/42; G01D 15/14; H04N 1/21
[52] U.S. Cl. .................................. 346/108; 346/160; 358/296
[58] Field of Search ................... 346/107 R, 108, 160; 358/285, 293, 296

[56] References Cited

U.S. PATENT DOCUMENTS

| | | | |
|---|---|---|---|
| 4,067,021 | 1/1978 | Baylis | 346/108 |
| 4,285,012 | 8/1981 | Ohara | 346/108 |
| 4,420,760 | 12/1983 | Phillips | 346/108 |

Primary Examiner—E. A. Goldberg
Assistant Examiner—Mark Reinhart
Attorney, Agent, or Firm—Fitzpatrick, Cella, Harper & Scinto

[57] ABSTRACT

A laser beam recorder has a scanner for scanning a laser beam and a photosensitive drum to which the laser beam is irradiated. The rotations of the scanner and the drum are essentially simultaneously started and stopped. If a predetermined rotation speed of the scanner is not reached at an end of a predetermined pre-rotation period of the drum, the pre-rotation period of the drum is extended until the predetermined rotation speed of the scanner is reached.

18 Claims, 6 Drawing Figures

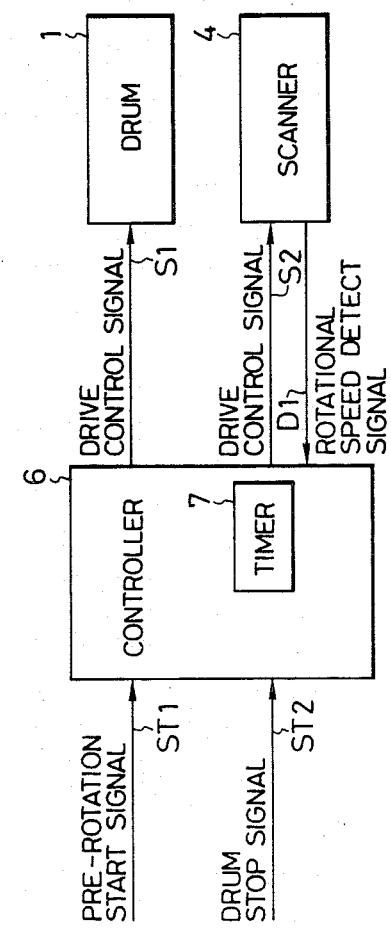

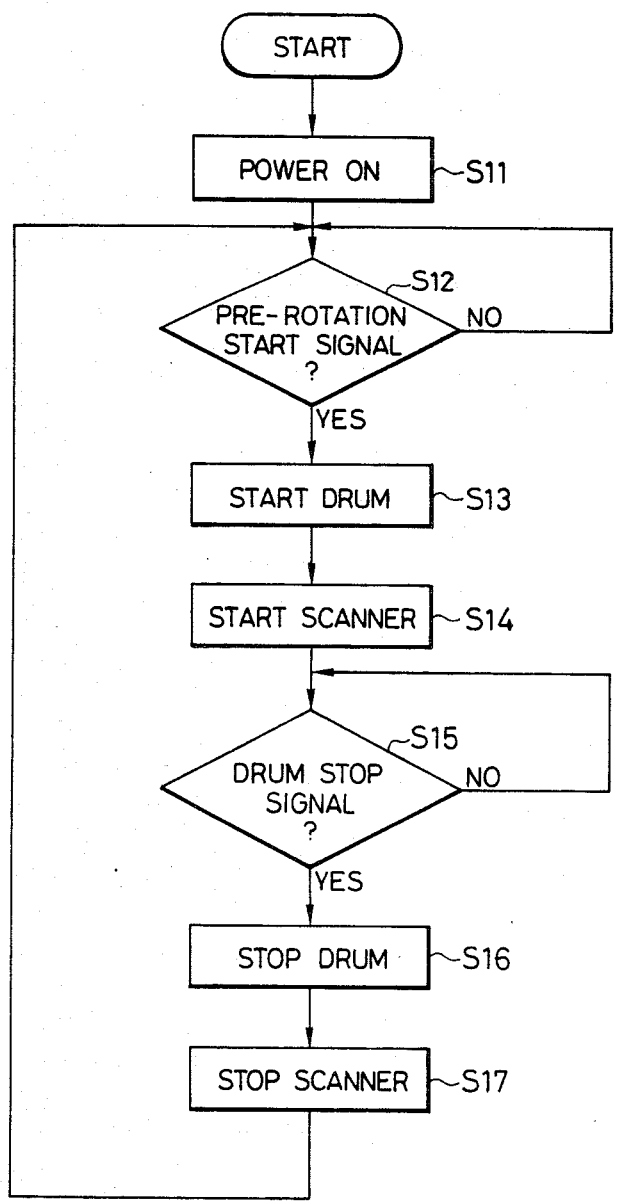

LASER BEAM RECORDER HAVING SYNCHRONIZED SCANNER AND DRUM OPERATIONS

BACKGROUND OF THE INVENTION

1. Field of the Invention

The present invention relates to a laser beam recorder for recording an image on a record medium by using a laser beam.

2. Description of the Prior Art

FIG. 1 shows a basic configuration of a laser beam printer, in which numeral 1 denotes a photosensitive (or photoconductive) drum, numeral 2 denotes a laser oscillator for generating a laser beam, numeral 3 denotes a collimator lens, numeral 4 denotes a scanner (polygon) for deflecting the laser beam, which is rotated in a direction of an arrow, numeral 5 denotes a focusing lens and numeral 6 denotes a controller for controlling the scanner.

In the laser beam printer, a pre-rotation process of the photosensitive drum is started in response to a start of print signal, and after the pre-rotation, the laser beam emitted by the laser oscillator 2 is modulated by a video signal, the modulated laser beam is converted to a narrow collimate beam by the collimator lens 3, the collimated beam is reflected by the polygon mirror of the scanner 4 which rotates at a predetermined speed, and the reflected beam is directed to the photosensitive plane of the rotating photosensitive drum 1 through the focusing lens 5 to form a latent image on the photosensitive drum 1. The polygon mirror of the scanner 4 is rotated by a scanner motor to scan the laser beam in a direction of an arrow (horizontally) on the photosensitive drum 1. In order to stably rotate the polygon mirror to orderly irradiate the laser beam to the photosensitive drum 1, the rotation speed of the scanner motor is precisely controlled by the controller 6.

However, in the prior art laser beam printer of this type, as shown in a flow chart of FIG. 2, when power is turned on (step S1), the scanner 4 starts to rotate independently from the rotation of the photosensitive drum 1 (step S2), maintains the rotation after a predetermined rotation speed has been reached (step S3), and the rotation of the scanner 4 is stopped (step S5) after the power is turned off (step S4). Accordingly, the scanner 4 continues to rotate while the power is supplied, and hence the lifetime of the scanner 4 is relatively short. The lifetime of the scanner 4 is directly reflected to the lifetime of the laser beam printer.

In the prior art laser beam printer, if the predetermined rotation speed of the scanner 4 is not reached at the end of the pre-rotation period, a printer error condition due to misrotation of the scanner may take place.

SUMMARY OF THE INVENTION

It is an object of the present invention to provide an improved laser beam recorder.

It is another object of the present invention to provide a laser beam recorder having an extended lifetime for a scanner and hence an extended lifetime for the recorder.

It is other object of the present invention to provide a laser beam recorder having a high operation percentage.

It is other object of the present invention to provide a laser beam recorder which extends a pre-rotation period until a predetermined rotation speed of a scanner is reached if it has not been reached during the predetermined pre-rotation period of the drum so that generation of a printer error condition is prevented and reduction of the printer operation percentage is prevented.

It is other object of the present invention to provide a laser beam recorder which prevents generation of a low quality image.

It is a further object of the present invention to provide a highly reliable laser beam recorder.

The other objects of the present invention will be apparent from the following description of the invention.

BRIEF DESCRIPTION OF THE DRAWINGS

FIG. 4 is a block diagram of one embodiment of the present invention, FIG. 5 is a flow chart showing a control operation in the embodiment of the present invention.

DETAILED DESCRIPTION OF THE PREFERRED EMBODIMENTS

Figure 1:
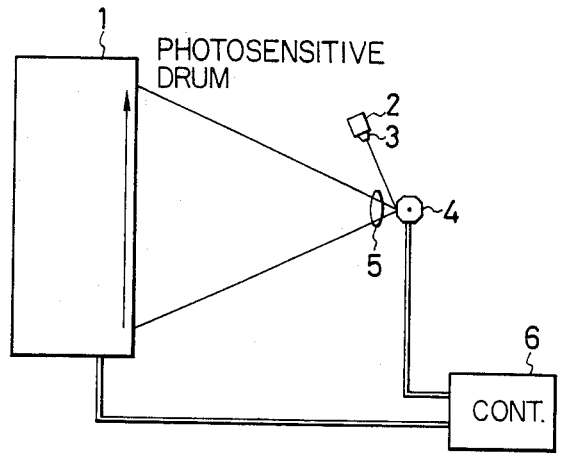
FIG. 1 shows a basic configuration of a laser beam printer to which the present invention is applicable.
Figure 3:
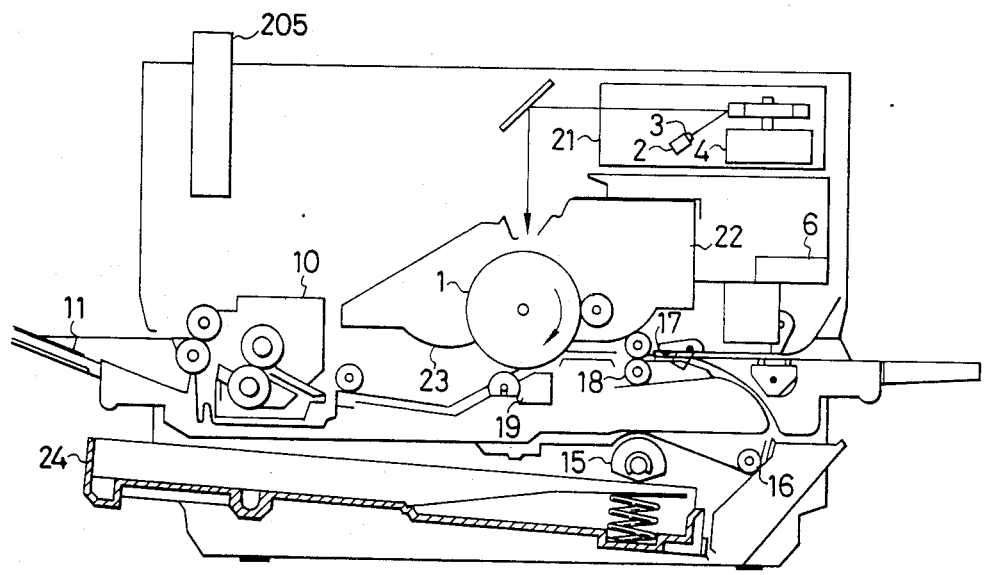
FIG. 3 is a schematic configuration of a laser beam printer to which the present invention is applicable.
Figure 2:
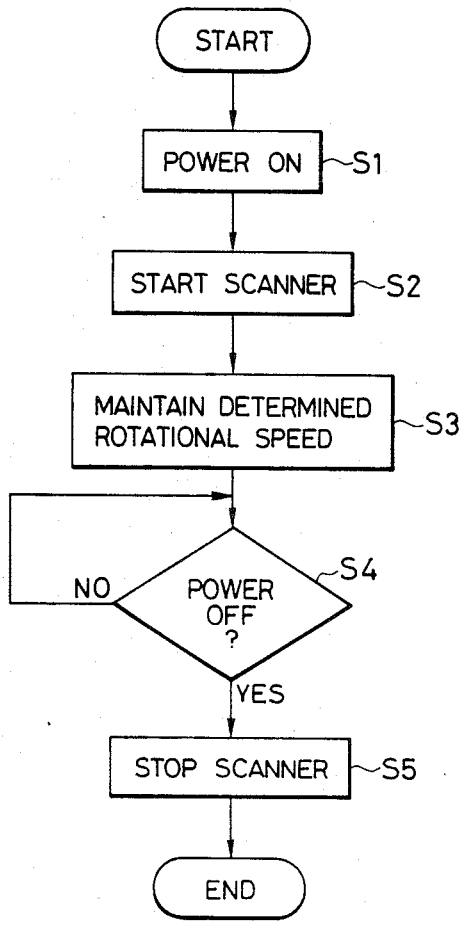
FIG. 2 is a flow chart showing a control operation in a prior art laser beam printer.

FIG. 3 shows a schematic sectional view of a laser beam printer to which the present invention is applicable. The elements having the like functions to those of FIG. 1 are designated by the like numerals. Numeral 21 denotes an exposure unit which has the scanner 4 and the laser oscillator 2 shown in FIG. 1. Numeral 22 denotes a developing unit for visualizing a latent image formed on the photosensitive drum 1 by the irradiation of a laser beam. Numeral 23 denotes a cleaner for cleaning the surface of the photosensitive drum 1, numeral 24 denotes a paper cassette, numeral 15 denotes a paper feed roller for feeding papers from the paper cassette 24 to a convey roller 16 one by one, and numeral 17 denotes a registration shutter. The paper conveyed by the convey roller 16 is temporarily stopped by the registration shutter 17 so that the irradiation of the laser beam, the rotation of the photosensitive drum 1 and the feed of the paper are synchronized. Numeral 18 denotes a feed roller for feeding the paper into a transfer unit 9, numeral 10 denotes a fixing unit for fixing a toner image transferred onto the paper, numeral 11 denotes a stacker for stacking ejected papers and numeral 205 denotes a pluggable character generator.

In the laser beam printer thus constructed, a series of operation timings for the feed of paper and the development are controlled by the sequence controller 6. This laser beam printer turns on and off the laser beam in accordance with a video signal supplied from a printer interface (not shown) to form a visual image on the photosensitive drum 1.

FIG. 4 is a schematic configuration of a control circuit in the present embodiment. The controller 6 starts the rotations of the drum 1 and the scanner 4 essentially simultaneously in response to a pre-rotation start signal ST1, and stops the rotations of the drum 1 and the scanner 4 essentially simultaneously in response to a drum stop signal ST2. The pre-rotation start signal may be sent from a host computer (not shown) at the time of start of print operation, and the drum stop signal may be sent from the host computer at the end of the print operation.

In the present embodiment, the pre-rotation (pre-processing) means begins processing prior to recording by the laser beam to rotate the drum to clean the drum surface by the cleaner 23 to stabilize the drum surface in order to prevent any disturbance in the recorded image.

The controller 6 checks if the predetermined rotation speed of the scanner 4 is reached at the end of the pre-rotation period set in an internal timer 7, and if it is not reached, the controller 6 extends the pre-rotation period of the drum 1 until the predetermined rotation speed of the scanner 4 is reached. Other configuration is similar to that of the prior art shown in FIG. 1 and explanation thereof is omitted.

Figure 6:
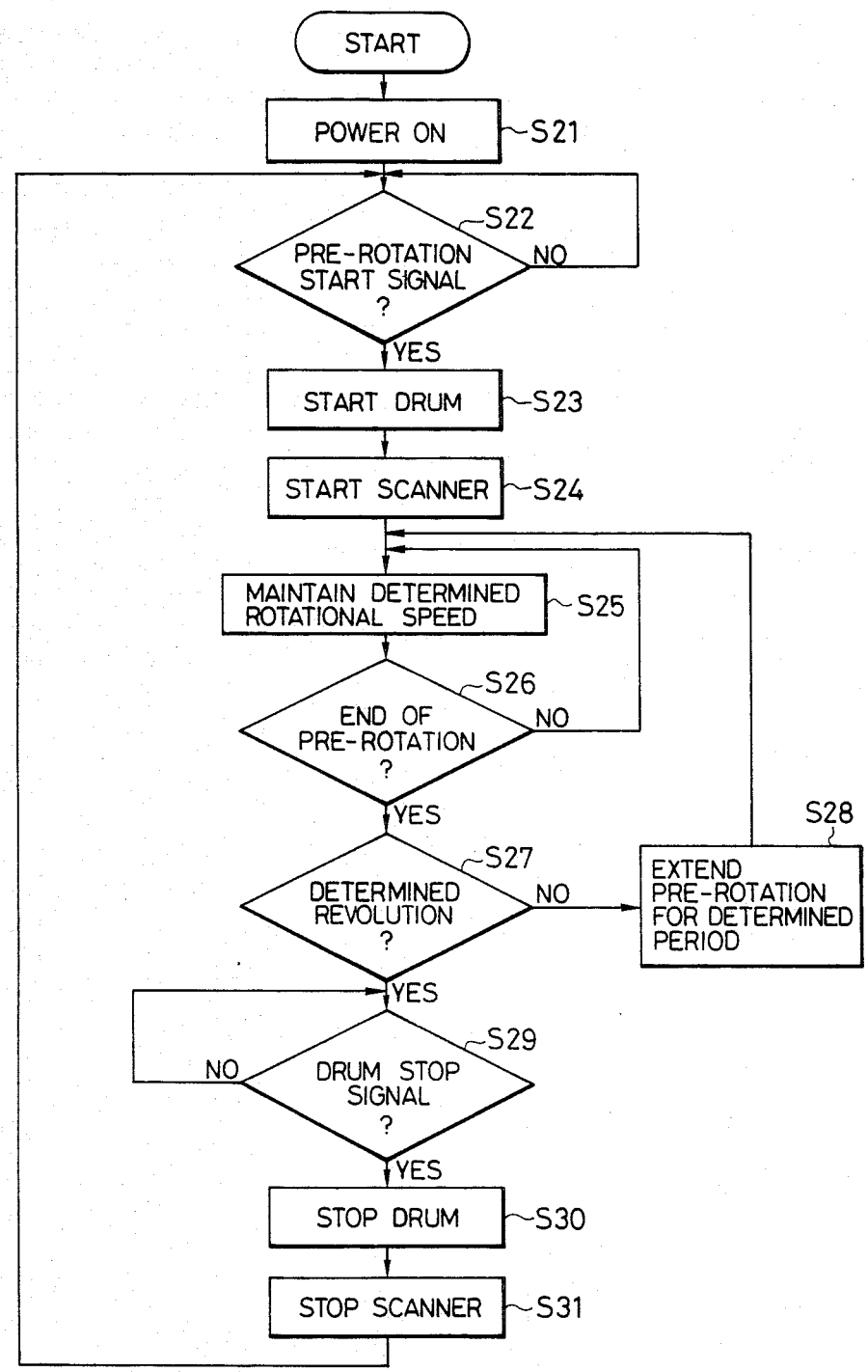
FIG. 6 is a flow chart showing a control operation in another embodiment of the present invention.

Referring to flow charts shown in FIGS. 5 and 6, the operation of the laser beam printer in the present embodiment is explained in further detail.

The flow chart of FIG. 5 shows the operation in the present embodiment. When a power is turned on (step S11), the scanner 4 is not driven (step S12) unless the pre-rotation start signal ST1 is applied to the controller 6. When the signal ST1 is applied to the controller 6 (step S12), the controller 6 produces drive control signals S1 and S2 to start the rotation of the drum 1 (step S13) and start the rotation of the scanner 4 (step S14). Thereafter, the controller 6 continues to rotate the drum 1 and the scanner 4 until the drum stop signal ST2 is applied to the controller 6, when the controller 6 turns off the drive control signals S1 and S2 to stop the rotations of the drum 1 and the scanner 4 essentially simultaneously (steps S16 and S17).

Then, in the step S12, the controller 6 waits for the next drum start signal ST1. During the wait period, the scanner 4 is not driven. If the power is turned off, the rotations of the drum 1 and the scanner 4 are stopped.

Because the rotation of the scanner 4 is started and stopped in synchronism with the start and the stop of the rotation of the drum 1, the wasteful rotation of the scanner 4 is avoided, the lifetime of the scanner 4 is extended and energy saving is attained.

The flow chart of FIG. 6 shows the operation of another embodiment of the present invention. After the power-on (step S21), the rotation of the drum 1 is started (step S23) in response to the application of the pre-rotation start signal (step S22), and the rotation of the scanner 4 is also started (step S24) and the scanner 4 is controlled to reach a predetermined rotation speed (step S25).

At the end of the pre-rotation period preset in the internal timer 7 (step S26), the controller 6 checks if the predetermined rotation speed of the scanner 4 is reached, by a rotation speed signal D1 supplied from the scanner 4 (step S27), and if the predetermined rotation speed is not reached, the controller 6 extends the pre-rotation period for a predetermined period (step S28), again carries out the rotation speed control step S25 and repeats the steps S25 to S28 until the predetermined rotation speed of the scanner 4 is reached. In the present embodiment, the rotation speed signal D1 is a pulse signal produced by an encoder attached to a motor shaft of the scanner 4, and the rotation speed control step is a PLL (phase locked loop) control process which uses the rotation speed signal D1. The controller 6 determines if the predetermined rotation speed of the scanner is reached, by an interval of pulses emitted from the encoder.

For a scanner having a relatively low rise-up in which the predetermined rotation speed is not reached within the predetermined pre-rotation period because of high predetermined rotation speed, the pre-rotation period is extended at the end of the predetermined pre-rotation period.

If the predetermined rotation speed is reached (step S27) at the end of the pre-rotation period (step S26), the drum 1 and the scanner 4 are steadily rotated until the drum stop signal is applied to the controller 6 to perform the normal print operation (step S29), and when the drum stop signal ST2 is applied to the controller 6, the drum 1 and the scanner 4 are stopped (steps S30 and S31) and the controller waits for the next pre-rotation start signal in the step S22.

Since the pre-rotation period of the drum 1 is extended until the predetermined rotation speed of the scanner 4 is reached, the misprint due to the misrotation of the scanner 4 is avoided.

The controller 6 of the above embodiment can be readily implemented by a commercially available microcomputer. The control procedures shown in FIGS. 5 and 6 are programmed and stored in a program memory of the microcomputer. Accordingly, a detail of the electric circuit is not explained here.

As described above, in the present embodiment, the drum and the scanner are started essentially simultaneously and stopped essentially simultaneously. Accordingly, in a laser beam printer having a high drum rotation stop period ratio while the power to the printer is on, the lifetime of the scanner is significantly extended and hence the lifetime of the printer is extended.

In a scanner having a high predetermined rotation speed and a relatively low rise-up, the drum pre-rotation period is extended. Therefore, the error state of the printer due to the misrotation of the scanner is prevented.

In the present embodiment, the polygon is used as the laser beam deflection means although other deflection means such as galvanomirror may be used.

While the photosensitive drum is used as the record medium in the present embodiment, other record medium such as a photosensitive belt may be used.

While the photosensitive drum and the polygon are essentially simultaneously started and stopped in the present embodiment, they may be started and stopped with a predetermined time lag.

If the predetermined rotation speed of the scanner is not reached within the predetermined pre-rotation period, the printer may be stopped and the abnormal state of the scanner may be indicated.

The present invention is not limited to the illustrated embodiments but various modifications thereof may be made within the scope of the appended claims.

What is claimed is:

1. A laser beam recorder comprising:
laser beam generating means;
drivable laser beam deflection means for deflecting the laser beam generated by said laser beam generating means;
a drivable record medium adapted to be irradiated by the laser beam deflected by said laser beam deflection means; and
control means for controlling the drives of said laser beam deflection means and said record medium, said control means performing a pre-processing operation of the record medium necessary for stable image recording, and controlling the initiation of the operation of said laser beam deflection means as a function of the pre-processing operation.

2. A laser beam recorder according to claim 1 wherein said control means initiates the pre-processing operation and the operation of said laser beam deflection means substantially simultaneously.

3. A laser beam recorder according to claim 1, wherein said control means causes said deflection means to reach a predetermined rotational speed during the period of said pre-processing operation.

4. A laser beam recorder according to claim 3 wherein said control means extends the period of said pre-processing operation when said deflection means does not reach the predetermined rotational speed at the conclusion of the period of the pre-processing period.

5. A laser beam recorder according to claim 4 wherein said deflection means has a polygon mirror.

6. A laser beam recorder according to claim 1 wherein said record medium is a photosensitive drum.

7. A laser beam recorder comprising:
 laser beam generating means;
 drivable laser beam deflection means for deflecting the laser beam generated by said laser beam generating means;
 a drivable record medium adapted to be irradiated by the laser beam deflected by said laser beam deflection means; and
 control means for controlling the drives of said laser beam deflection means and said record medium, said control means performing a pre-processing operation of the record medium necessary for stable image recording, and causing said deflection means to reach a predetermined rotational speed by the conclusion of the period of the pre-processing operation.

8. A laser beam recorder according to claim 7 wherein said control means extends the period of the pre-processing operation when said deflection means does not reach predetermined rotational speed at the conclusion of the period of the pre-processing period.

9. A laser beam recorder according to claim 7 wherein said control means controls the initiation of the operation of said laser beam deflection means as the function of the initiation of the pre-processing operation.

10. A laser beam recorder according to claim 7 wherein said control means initiates the pre-processing operation and initiates the operation of said laser beam deflection means substantially simultaneously.

11. A laser beam recorder according to claim 7 wherein said deflection means has a polygon mirror.

12. A laser beam recorder according to claim 7 wherein said record medium is a photosensitive drum.

13. A laser beam recorder according to claim 1, wherein said control means shifts the initiation of the pre-processing operation relative to the initiation of operation of said laser beam deflection means by a predetermined period of time.

14. A laser beam recorder according to claim 9, wherein said control means shifts the initiation of the pre-processing operation relative to the initiation of operation of said laser beam deflection means by a predetermined period of time.

15. A laser beam recorder according to claim 2, wherein said control means stops the operation of said recording medium and said laser beam deflection means substantially simultaneously.

16. A laser beam recorder according to claim 10, wherein said control means stops the operation of said recording medium and said laser beam deflection means substantially simultaneously.

17. A laser beam recorder according to claim 4, wherein said control means provides a signal representing a failure when said deflection means does not reach the predetermined rotational speed after the extended period.

18. A laser beam recorder according to claim 8, wherein said control means provides a signal representing a failure when said deflection means does not reach the predetermined rotational speed after the extended period.

* * * * *